Patented Sept. 18, 1945

2,384,821

UNITED STATES PATENT OFFICE 2,384,821

OCTAFLUOROCYCLOBUTANE AND PYROLYTIC PROCESS FOR ITS PRODUCTION

Frederick B. Downing, Carneys Point, and Anthony F. Benning and Robert C. McHarness, Woodstown, N. J., assignors to Kinetic Chemicals, Inc., Wilmington, Del., a corporation of Delaware No Drawing. Application May 11, 1944,
Serial No. 535,208

3 Claims. (Cl. 260—648)

This case is a continuation-in-part of U. S. Serial No. 435,064 filed March 17, 1942, U. S. Serial No. 475,526 filed February 11, 1943, and of U. S. Serial No. 484,313 filed April 23, 1943. Examples taken from the earlier filed cases will retain the numbers which they had in those cases.

This invention relates to the preparation of organic fluorine compounds by pyrolysis. By pyrolysis, we mean the transformation of a compound into another substance or other substances through the agency of heat alone. (Hurd, The Pyrolysis of Carbon Compounds, p. 9.) The term "pyrolysis" used in this specification, therefore, will include not only the decomposition of compounds but also the making of more complex compounds. In the applications identified as Benning et al., Serial No. 344,666, filed July 10, 1940, and Benning Serial No. 379,473, filed February 18, 1941, now Patent No. 2,343,252, dated March 7, 1944, are disclosed two processes involving a reaction between a fluoro-hydrocarbon and HCl in the presence of a catalyst. Those reactions may be described as additive, since their apparent course is the addition of HCl to the olefine in the place of double bonds. Those reactions were carried out at comparatively low temperatures, in most cases below 350° C., because those temperatures were satisfactory and because observations of a limited number of experiments at higher temperatures showed the existence of what were thought to be undesirable side reactions. We have now discovered that the side reactions are pyrolytic and of a fundamentally different nature than HCl addition, and that they can be put to valuable use.

It is an object of this invention to produce organic compounds by pyrolysis. Another object of the invention is to produce compounds which are useful, by methods which are economically and technically satisfactory. Another object of the invention is to produce new fluoro hydrocarbons. A particular object of the invention is to produce the compound having the empirical formula $C_4F_8$, a boiling point of about —5° C., and a vapor density of about 8.2 grams per liter at 27° C., which is believed to be octa-fluorocyclo-butane and to have the formula:

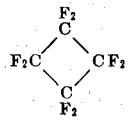

by methods which are technically and economically satisfactory.

According to our invention fluoro-chloro alkanes, and fluoro-chloro alkenes, and fluoro alkenes, which may otherwise be called fluoro-chloro saturated aliphatic, fluoro-chloro unsaturated aliphatic, and fluoro unsaturated aliphatic compounds, are made into other compounds by pyrolysis. Inert gases such as nitrogen and helium may be present as diluents or buffers.

Fluor-chlor compounds are preferred as starting materials. The material preferred for the production of $C_4F_8$ is $CHClF_2$.

Although for the production of particular compounds the reaction will be carried out under well-controlled conditions of time, temperature, and pressure, complex mixtures of compounds of various molecular weights can be produced by subjecting the compounds to pyrolytic conditions for extended periods of time. Pressures may also be used to vary the results, although for the purposes of economy and safety each particular reaction should be carried out with the lowest pressure consistent with optimum results. For example, pressures of four atmospheres absolute have been found satisfactory in many cases. In general, operations may be carried out at pressures between .1 and 10 atmospheres absolute, but other pressures are useful and may be employed when an increase in efficiency will result.

This is a pyrolytic process. The disintegration and integration are produced essentially by heat. It is, therefore, important to select a temperature which will efficiently produce the reaction. The temperature should be selected to give optimum production of the desired product. We have found that excellent pyrolytic results have been produced at temperatures between 600° and 1000° C., but that particular substances have been pyrolyzed at temperatures as low as 400° C. and above 1000° C. under appropriate conditions of time and pressure. Electrical heating is efficient, but any method of heating may be applied. The temperatures which are used must also be chosen in view of the materials that compose the reaction apparatus.

The time of exposure of the reactants to the pyrolytic conditions is a matter of considerable importance where a particular product is desired. Extending the period of exposure frequently produces compounds of increased molecular weight.

In general, the pyrolysis proceeds to the integration of new fluoro hydrocarbons efficiently in the absence of catalysts.

The process is preferably carried out continuously by passing the convertible material through a tube heated to a pyrolytically effective temperature. The tube should be composed of a material which is inert to the reaction and the reaction products. Carbon and the noble metals are sufficiently inert and have proved to be satisfactory materials for the construction of reaction chambers. The chamber need not be wholly composed of the inert material, but may be lined with it. Reaction chambers containing a platinum lining are particularly satisfactory. The process may be carried out in batches rather than continuously, but continuity is preferred.

The following examples are presented, not as constituting any limitation of the work which has actually been done, but as sufficiently representative to enable persons skilled in the art to practice the invention. In these examples, the terms "conversion" and "amount converted" include the assumption that the disappearance of one mol of the primary organic material resulted in the liberation of one mol of halogen acid. This assumption is warranted by the close agreement between the figures for conversion obtained by acid analysis and the actual primary material which disappeared. Unless otherwise noted, the examples were carried out at a pressure of about one atmosphere. The temperatures of the pyrolyses were measured with a thermocouple which was placed in contact with the outer surface of the reaction tube near the center of the heated zone, so that the true average temperatures of the gases in the tube may have been somewhat lower than the values given.

*Example I*

One hundred eighty grams of $CHClF_2$ were passed through a silver tube 8.0 mm. i. d. x 700 mm. long at a rate of about 120 g./hr. while the pressure in the tube was kept at approximately one atmosphere abs. The tube temperature was maintained at about 700° C. over an estimated length of 200 mm. by electrical heating. The reaction products were washed with water, dried and condensed in receivers cooled to about −70° C. The crude organic products (156 g.) were separated by fractional distillation and were composed as follows:

| Component | Amount present, volume per cent |
|---|---|
| $CF_2=CF_2$ (B. P.=−76° C.) | 13.7 |
| $CHClF_2$ (B. P.=−40.8° C.) | 85.7 |
| Material boiling above −40° C | 0.6 |

This was equivalent to a disappearance of 28% of the $CHClF_2$ fed and a yield of $C_2F_4$ therefrom of 83%. Analysis of the wash water for acid indicated that a conversion of 27% had taken place. Among the materials boiling above −40° C., $C_4F_8$ (octa-fluoro-cyclo-butane) was isolated and identified. This material had a boiling point of −5° C. and a freezing point of about −40° C.

*Example XVIII*

Provision was made to operate the apparatus described in Example I at an absolute pressure of 0.5 atm. $CHClF_2$ (B. P. −40.8° C.) was passed through the tube at a rate of about 35 g./hr. and a temperature of about 700° C. The reaction products were washed with water, dried and condensed in receivers cooled to about −70° C. and −170° C., respectively. Acid analysis showed a conversion of 50%. The composition of the crude was as follows:

| Component | Amount present, volume per cent |
|---|---|
| $C_2F_4$ | 30.5 |
| $CHClF_2$ | 67.8 |
| Material boiling above −40° C | 1.7 |

A $C_2F_4$ yield of 89% was obtained. Among the materials boiling above −40° C., $C_4F_8$ (octa-fluoro-cyclo-butane) was isolated and identified. This material had a boiling point of −5° C. and a freezing point of about −40° C.

*Example XXII*

In a large scale pyrolysis of $CHClF_2$ under conditions similar to that used in Example I, a large amount of material boiling above −40° C. was obtained. The following are among the compounds which were isolated and identified. Some of their physical constants are given.

| No. | Compound | B. Pt. | Density | nD | Mol. wt.[1] | |
|---|---|---|---|---|---|---|
| | | | | | Calc. | Found |
| | | ° C. | | | | |
| 1 | $HC_3F_6Cl$ | 21 | $d_4^6=1.556$ | 1.29 (calc.) | 186.5 | 193.5 |
| 2 | $HC_4F_8Cl$ | 50 | $d_4^{20}=1.607$ | <1.30 | 235.5 | 241.8 |
| 3 | $HC_5F_{10}Cl$ | 77 | $d_4^{20}=1.661$ | 20°<1.30 | 286.5 | 295.8 |
| 4 | $HC_6F_{12}Cl$ | 101 | $d_4^{20}=1.719$ | 5° 1.3012 | | |
| 5 | $HC_7F_{14}Cl$ | 123 | $d_4^{20}=1.738$ | 5° 1.3070 | | |
| 6 | $HC_8F_{16}Cl$ | 143 | $d_4^{20}=1.778$ | 5° 1.3088 | | |
| 7 | $HC_{12}F_{24}Cl$ | 226 | | | | |
| | | | Vapor density | | | |
| 8 | $C_3F_4HCl$ | −10 | 5.7 g./l. at 27° C. | | | |
| 9 | $C_4F_8$ | −5 | 8.2 g./l. at 27° C. | | | |

[1] Assumes $PV=RT$ which for compounds of this type gives an M. W. from 2 to 4% high.

Several constant-boiling mixtures were also obtained in the pyrolysis products. One fraction boiled at about −12° C. and contained a mixture of $C_2HClF_4$ (B. P. −10° C.) and $C_4F_8$, (B. P. −4 to −5° C.). This latter material was identified as octa-fluoro-cyclo-butane.

*Example XXXIII*

A platinum-lined, Inconel-jacketed nickel tube, 42″ x 0.5″ i. d. was used in the pressure pyrolysis of $CHClF_2$. The pyrolysis temperature was maintained over an estimated length of 20 cm. by electrical heating. The desired pressure and conversion were maintained by control of the temperature and flow of the organic material. The reaction products were then washed, dried and condensed in receivers cooled in carbonice-acetone baths. No attempts were made to collect any of the gasses passing through the carbonice-acetone traps. The liquid condensates were then distilled in a laboratory helices-packed column and the amount of $CHClF_2$ destroyed by the process thus determined.

The results of the pyrolysis of $CHClF_2$ under various conditions of temperature, pressure, and conversion are given in the table:

| No. | Pressure, lbs. abs. | Pyrolysis, C. | Pyrolysis of $CHClF_2$ under pressure | |
|---|---|---|---|---|
| | | | Per cent conversion | Per cent "high boilers"[1] |
| 1 | 15 | 700 | 25 | 10 |
| 2 | 55 | 650 | 35–38 | 22 |
| 3 | 55 | 740–745 | 78–80 | 43 |
| 4 | 95 | 810–820 | 100 | 27 |
| 5 | 95 | 740 | 75–80 | 32.5 |
| 6 | 95 | 720 | 82 | 35.6 |
| 7 | 95 | 205–620 | 39 | 37.2 |
| 8 | 385 | 660 | 60 | 39.5 |

[1] The percent "high boilers" is based on the amount of $CHClF_2$ which disappeared in the reaction by pyrolysis.

The above table shows that an increase in pressure generally results in the increase of the percentage of "high boilers" obtained in the pyrolysis.

Although the composition of these products varied in each run, over a boiling range of −12 to over 190° C., over 65% of the "high boilers" were $H(CF_2)_3Cl$ and $H(CF_2)_4Cl$. Among the materials boiling above −40° C., $C_4F_8$ (octa-fluoro-cyclo-butane) was isolated and identified. This material had a boiling point of −5° C. and a freezing point of about −40° C.

The $C_4F_8$ may be separated from the $C_2F_4HCl$ by various methods. A preferred method is by the oil extraction process described in the application of Benning and Park Serial No. 501,151 filed September 3, 1943. Another method, which may be employed and which has been employed satisfactorily, comprises converting $C_2F_4HCl$ to $C_2F_4Cl_2$ by chlorination followed by fractionally distilling. A representative chlorination and separation was carried out as follows:

A 5-liter balloon flask was evacuated and 15 cc. of water was added. The constant boiling mixture of $C_4F_8$ and $C_2F_4HCl$, described in Example XXII, was then added to the flask until the pressure had reached about half an atmosphere. Gaseous chlorine was allowed to enter the flask until the pressure in the flask reached 1.05 atmospheres. When the flask was irradiated with a Photoflood lamp, the temperature quickly rose to between 70 and 80° C. (Sunlight will catalyze the reaction in the same way.) After irradiation for 3 hours, the gas in the flask was displaced with water, and passed through a 15% solution of sodium hydroxide in water to remove any HCl and unreacted chlorine. The gas was then led through a tower filled with granular calcium chloride, in order to dry it, and finally into a condenser cooled with carbon ice. The condensed liquid was fractionated in a fractionating column of the Podbielniak type, at a reflux ratio of approximately ten to one. The first fraction to distill had a boiling point of −5 to −4° C., at 760 mm. pressure. This material had a vapor density of 8.44 grams per liter at 22° C., and 757 mm. It had a freezing point of −40° C.

Among the factors used to identify $C_4F_8$ and to determine its structure are its vapor density, its molecular weight which was found as 204 and calculated as 200, and the fact that it did not decolorize a solution of bromine when exposed to sunlight in a glass pressure flask. Antimony pentafluoride $SbF_5$ did not affect the compound even after prolonged heating at 160° C. Because of these characteristics and of others which need not be set forth herein, a cyclic structure has been assigned to this compound, but it is intended that the compound shall be protected even though later investigation discloses a different space arrangement of its atoms.

The reaction products may be washed with water or alkaline solution to remove acid constituents before condensation and analysis, although this is not necessary. In some cases, it is advantageous to separate certain desired components before acid removal.

A very important compound which is produced by this process is octa-fluoro-cyclo-butane, which is very stable and is useful in heat transfer systems, as a refrigerant, as a solvent and for the generation of power.

The particular advantage of the invention is that a pyrolytic process has been discovered for the production of $C_4F_8$, which is characterized by its simplicity and the ease with which it may be operated. The pyrolysis has been carried out in both a continuous and a stepwise manner, and a large variety of conditions has been employed, so that it is beyond question that the process is of general application.

As many apparently widely different embodiments of this invention may be made without departing from the spirit and scope thereof, it is to be understood that we do not limit ourselves to the specific embodiments thereof except as defined in the appended claims.

We claim:
1. Octa-fluoro-cyclo-butane.
2. The process of producing $C_4F_8$ which comprises passing $CHClF_2$ through an inert reaction tube at between 600° C. and 1000° C. for sufficient time to pyrolyze the $CHClF_2$ and convert a substantial proportion thereof to $C_4F_8$ and then separating the $C_4F_8$ from the reaction products.
3. The process of producing $C_4F_8$ which comprises passing $CHClF_2$ through an inert reaction tube at from about 700° C. to about 800° C. for sufficient time to pyrolyze the $CHClF_2$ and convert a substantial proportion thereof to $C_4F_8$ and then separating the $C_4F_8$ from the reaction products.

FREDERICK B. DOWNING.
ANTHONY F. BENNING.
ROBERT C. McHARNESS.

---

CERTIFICATE OF CORRECTION.

Patent No. 2,384,821.  September 18, 1945.

FREDERICK B. DOWNING, ET AL.

It is hereby certified that error appears in the printed specification of the above numbered patent requiring correction as follows: Page 2, second column, line 1, for "$C_2F_8$" read --$C_4F_8$--; and that the said Letters Patent should be read with this correction therein that the same may conform to the record of the case in the Patent Office.

Signed and sealed this 25th day of December, A. D. 1945.

Leslie Frazer
First Assistant Commissioner of Patents.